(12) United States Patent
Schmode

(10) Patent No.: US 7,503,119 B2
(45) Date of Patent: Mar. 17, 2009

(54) TOOL FOR STRIPPING CABLES

(75) Inventor: Hartmut Schmode, Blomberg (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 180 days.

(21) Appl. No.: 11/432,588

(22) Filed: May 11, 2006

(65) Prior Publication Data

US 2006/0260132 A1 Nov. 23, 2006

(30) Foreign Application Priority Data

May 18, 2005 (DE) .................. 20 2005 008 034 U

(51) Int. Cl.
*B21F 13/00* (2006.01)
(52) U.S. Cl. ........................ 30/90.7; 30/90.4
(58) Field of Classification Search .............. 30/90.1, 30/90.3, 90.4, 90.6–90.8, 91.1, 91.2, 112, 30/92.5, 93–96, 101, 102; 81/9.4, 9.41–9.43; 29/564.4
See application file for complete search history.

(56) References Cited

U.S. PATENT DOCUMENTS

| 500,443 | A | * | 6/1893 | Tyler | 30/101 |
|---|---|---|---|---|---|
| 2,870,536 | A | * | 1/1959 | Lutsker | 30/102 |
| 5,203,083 | A | * | 4/1993 | Domonoske | 30/92 |
| 6,477,776 | B1 | * | 11/2002 | Jee | 30/90.1 |
| 6,526,661 | B1 | * | 3/2003 | Shutts et al. | 30/90.1 |
| 6,658,739 | B1 | * | 12/2003 | Huang | 30/96 |
| 6,718,638 | B2 | * | 4/2004 | Liaw | 30/90.7 |
| 2004/0055160 | A1 | * | 3/2004 | Ducret | 30/90.1 |

FOREIGN PATENT DOCUMENTS

| DE | 1059064 | 6/1959 |
|---|---|---|
| DE | 2044036 | 3/1971 |
| DE | 3512065 | 10/1986 |

* cited by examiner

*Primary Examiner*—Kenneth E. Peterson
*Assistant Examiner*—Phong Nguyen
(74) *Attorney, Agent, or Firm*—Lawrence E Laubscher, Sr.; Lawrence E Laubscher, Jr.

(57) ABSTRACT

A compact insulation stripping tool includes a U-shaped tool body to which are pivotally connected a pair of clamping jaws that pivot about parallel spaced pivot axes, thereby to clamp an insulated conductor within clamping recesses contained in the extremities of the leg portions of the tool body. A knife is supported between the leg portions by a knife support member arranged in an opening contained in the transverse base portion of the tool body. The knife has a linear cutting edge, and the knife support member is rotatable between first and second positions in which the knife edge extends alternatively transversely and longitudinally of the insulated cable. A depth control member controls the depth of cut of the knife edge into the insulation layer. The clamping jaws are interconnected for simultaneous movement relative to the tool body, and have relatively short operating levers.

9 Claims, 5 Drawing Sheets

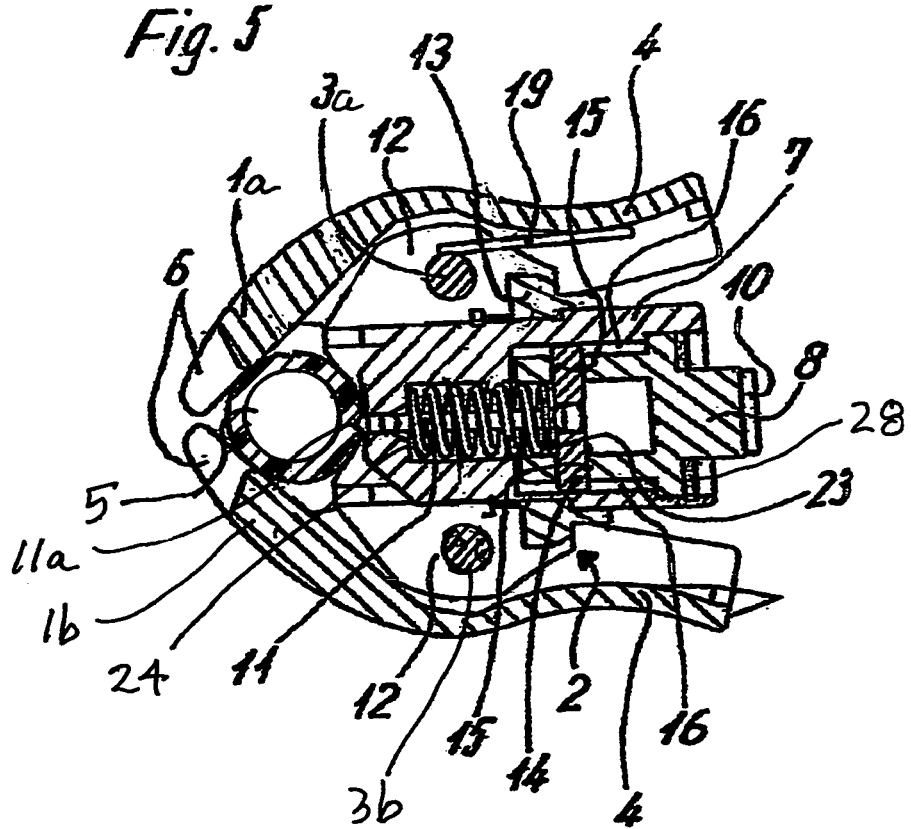
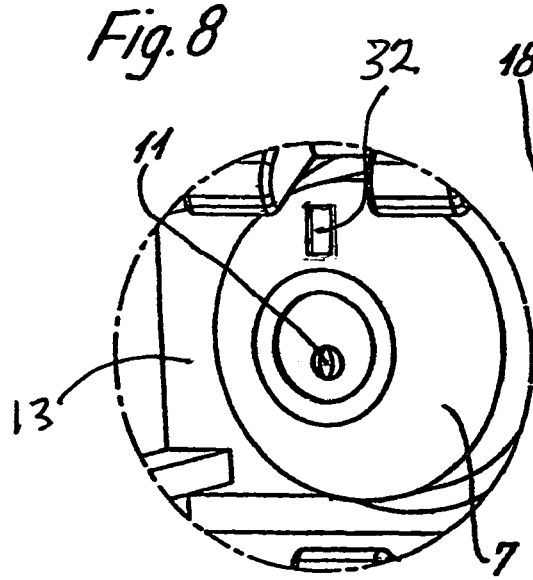
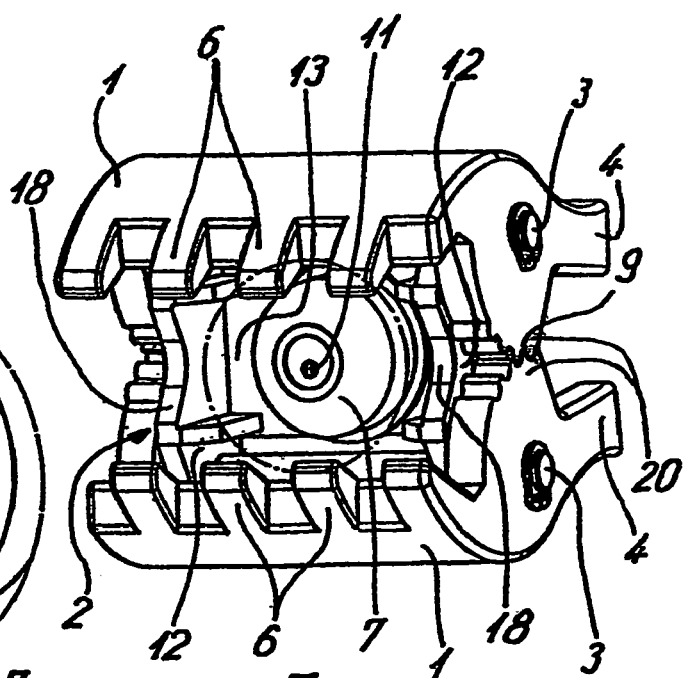

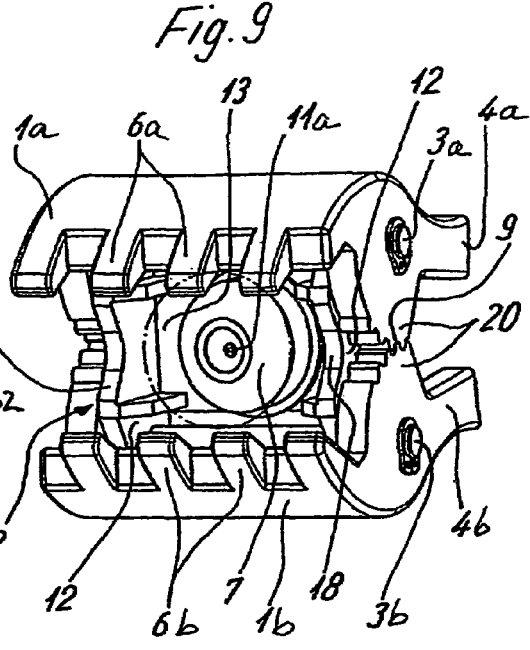
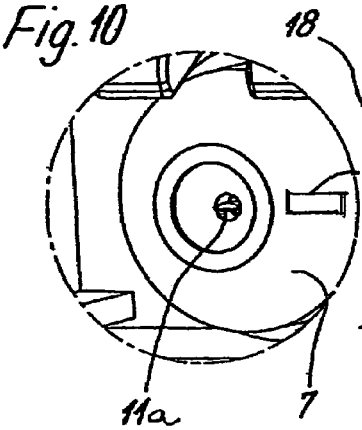
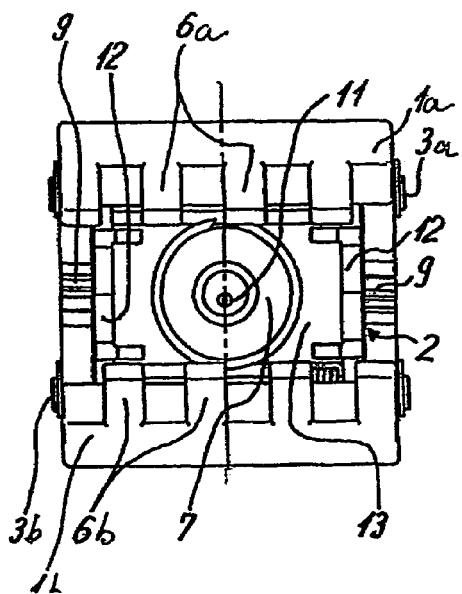
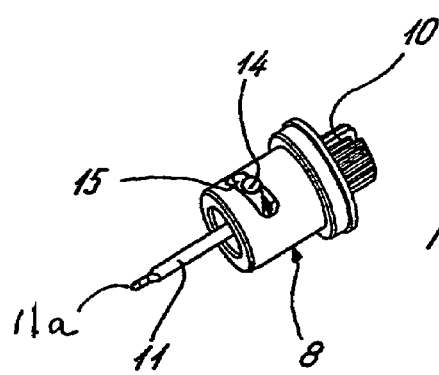

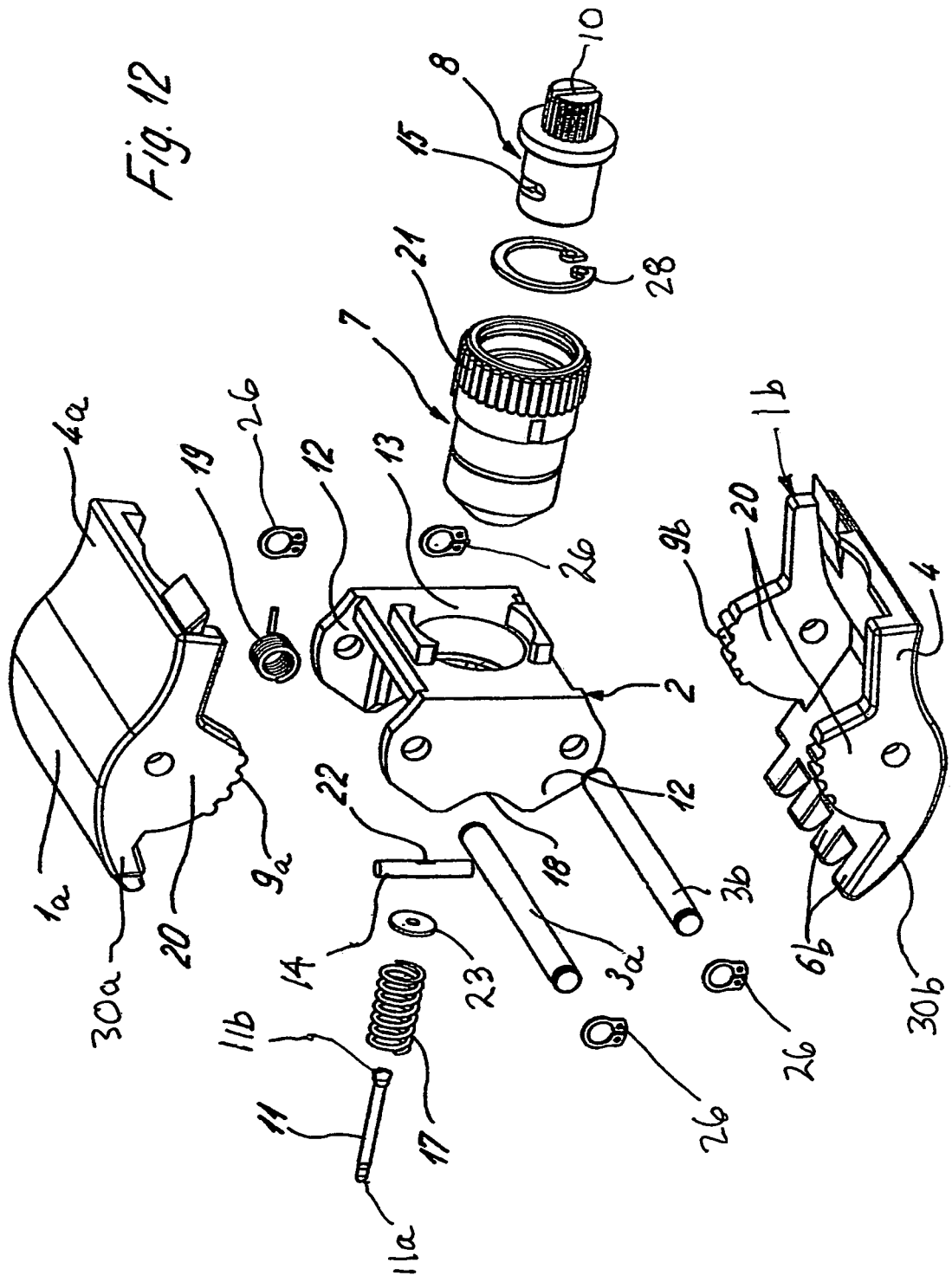

TOOL FOR STRIPPING CABLES

BACKGROUND OF THE INVENTION

1. Field of the Invention

A compact insulation stripping tool includes a U-shaped tool body to which are pivotally connected a pair of clamping jaws that pivot about parallel spaced pivot axes, thereby to clamp an insulated conductor within clamping recesses contained in the extremities of the leg portions of the tool body. A knife is supported between the leg portions by a knife support member arranged in an opening contained in the transverse base portion of the tool body. The knife has a linear cutting edge, and the knife support member is rotatable between first and second positions in which the knife edge extends alternatively transversely and longitudinally of the insulated cable. A depth control member controls the depth of cut of the knife edge into the insulation layer.

2. Description of Related Art

It is well known in the prior art to provide insulation stripping tools for removing the insulation outer casing of an electrical cable, for which purpose two parallel circumferential cuts of the insulation casing are made, as well as one axial cut between the two cuts, so that the insulation casing can be removed without any problem.

One example of such a tool is presented by the German patent No. DE 35 12 065 C1. In this reference, the stripping tool includes two clamping legs, one of which is fixed and carries two cutting blades for the formation of the circumferential cuts, while the other one has a cutting blade for making the axial cut, which clamping legs are connected for pivotal movement about a common pivot axis. A relatively great length of clamping legs is required to operate this tool, in order to be able to apply an adequate clamping force by means of an inserted compression spring; however, but that great length severely restricts the usefulness of the tool. This is, above all, so because the insulation removal work must be done on previously installed cables where very tight space conditions prevail in many instances, and they do not at all permit any unhindered rotation of the tool around the cable, thereby makings the job very difficult.

The present invention was developed to provide a stripping tool that it will have an extremely simple compact structure in terms of design, whereby its handling ability will be improved greatly.

SUMMARY OF THE INVENTION

Accordingly, a primary object of the present invention is to provide a compact insulation stripping tool including a pair of clamping jaws that are pivotally connected intermediate their ends with a tool body for pivotal movement about a pair of parallel spaced pivot shafts, respectively, said tool body having a generally U-shaped cross-sectional configuration defining a pair of leg portions between the pivot shafts are mounted. Knife means support an insulation cutting knife between and parallel with the tool body leg portions. The end extremities of the tool body leg portions contain clamping recesses into which the insulated conductor is laterally clamped, whereby upon movement of the tool body relative to the insulated conductor, the knife produces a cut in the insulation layer of the conductor.

According to a more specific object of the invention, the cutting knife has a generally cylindrical knife body one end of which carries a linear transverse cutting edge, said knife being carried by a knife support member that is rotatably mounted in an opening contained in the base portion of the tool body, whereby the knife body may be rotated alternately through 90° about its longitudinal axis between a first position in which the knife edge is normal to the axis of the insulated conductor to produce a circular circumferential cut in the insulation layer, and a second position in which the knife edge is parallel with the longitudinal axis of the insulated conductor, thereby to produce a longitudinal cut in the insulation layer.

A further object of the invention is to include in the knife support means a depth control member that is adjustable to control the depth of either the circular circumferential cut or the longitudinal cut in the insulation layer.

According to still another object, by pivoting the clamping jaws intermediate their ends about separate pivot axes, the operating levers for the clamping jaws may be relatively short, thereby resulting in a very compact stripping tool. Spring means bias the clamping jaws toward their closed clamping position. The stripping tool is suitable for use with insulated conductors having diameters of various sizes. In order to accommodate insulated conductors having relatively small diameters, the clamping ends of the jaws are provides with staggered teeth that are in interlocking relation when the jaws are in their fully closed clamped positions.

With the aid of this construction design, the tool can be made very short radially with respect to the lever by about 40 mm or less, whereby on each clamping jaw, there is molded an operating lever or handle with which the clamping jaw can be pivoted about the associated pivot axis. To pivot the clamping jaws simultaneously, the latter engage each other in an inter-locking manner, for which purpose a pinion gear arrangement is concentrically provided around corresponding pivot axes.

Furthermore, according to an advantageous embodiment of the invention, the free ends of the clamping jaws are provided with staggered teeth that can be interlocked with each other, as a result of which one can make sure that the most widely differing cable diameters can be firmly clamped.

The tool body serves as abutment for the cable, and that tool body is preferably made in the shape of a depression for receiving the cable that is to be stripped. Furthermore, the knife blade is retained in the tool body by a support sleeve is rotatably connected with the tool body. The carrying sleeve is so positioned in the tool body that a turn by 90° is possible, so that the inserted knife blade can be used both for the circumferential removal of the insulation casing and for axial opening of the cut. To recognize the particular position of the knife blade, one can provide indicia means or an observation window through which the knife blade can be recognized from the outside. It is also conceivable to make the relevant parts from a transparent plastic substance.

Another possibility of recognizing the position of the knife blade consists in the following: The carrying sleeve is provided with a marking, for example, an arrow, a lever or the like, which is aligned in accordance with the position of the knife blade. To adjust the knife blade to the depth of the cut, which is required to be able to cut up insulation casings of different thickness, the knife blade, which is retained in a manner secured against twisting in the carrying sleeve, is held in a setting sleeve that is secured against further shifting, which setting sleeve can be moved axially with relation to the carrying sleeve. The axial movement of the setting sleeve, and thus the adjustment of the depth of the cut of the knife blade that, as mentioned, of course, is secured against being shifted but that is positioned in a rotatable manner on the setting sleeve, can be forced by a slide guide, which, for example, consists of a slide track in the setting sleeve and a slide pin in the carrying sleeve.

It is also possible to arrange the setting sleeve that is rotatably connected with, and secured against axial displacement shifting relative to, the knife support member. The knife blade is secured against rotation and axial displacement in a cross-pin the ends of which are guided in longitudinal guide grooves formed in the knife support member, and that is axially movable with respect to the knife support member. As the depth control sleeve is rotated, the cross-pin, and thus the knife blade, are moved axially according to the slide track, as a result a which a change in the depth of the cut of the knife blade is achieved.

The advantage inherent in the slide guide consists in the following: In case of a slight rotary movement of the depth control member, one can perform a large cut depth adjustment, whereby the slide track naturally runs on an inclined guide slot corresponding to the desired depth adjustment in the direction of rotation of the depth control member.

Along with a central arrangement of the knife blade in the knife support member, the following is also provided according to yet another inventive concept: The knife blade is arranged centrally so that the knife blade is guided automatically from a longitudinal cut position upon the start of a round cut into this round cut position. The adjustment of the knife blade by means of the knife support member is thus required merely when the knife blade is to be removed from a round cut position into a longitudinal cut position.

BRIEF DESCRIPTION OF THE DRAWINGS

Other objects and advantages of the invention will become apparent from a study of the following specification, when viewed in the light of the accompanying drawing, in which:

FIG. 5 is a sectional view taken along line 5-5 of FIG. 2;

FIGS. 6 and 7 are front elevation and perspective views, respectively, of the tool with the clamping jaws in the open condition;

FIG. 8 is a detained view of the knife support means in the transverse cutting position;

FIG. 9 is a front perspective view of the tool in the open condition and with the knife support body in the longitudinal cutting position;

FIG. 10 is a detailed view of the knife support member in the longitudinal cutting position;

FIG. 11 is a perspective view the assembly of the depth control member, the cross-pin, and the knife body; and FIG. 12 is an exploded view of the insulation stripping tool of FIG. 1.

DETAILED DESCRIPTION OF THE INVENTION

Figure 1:
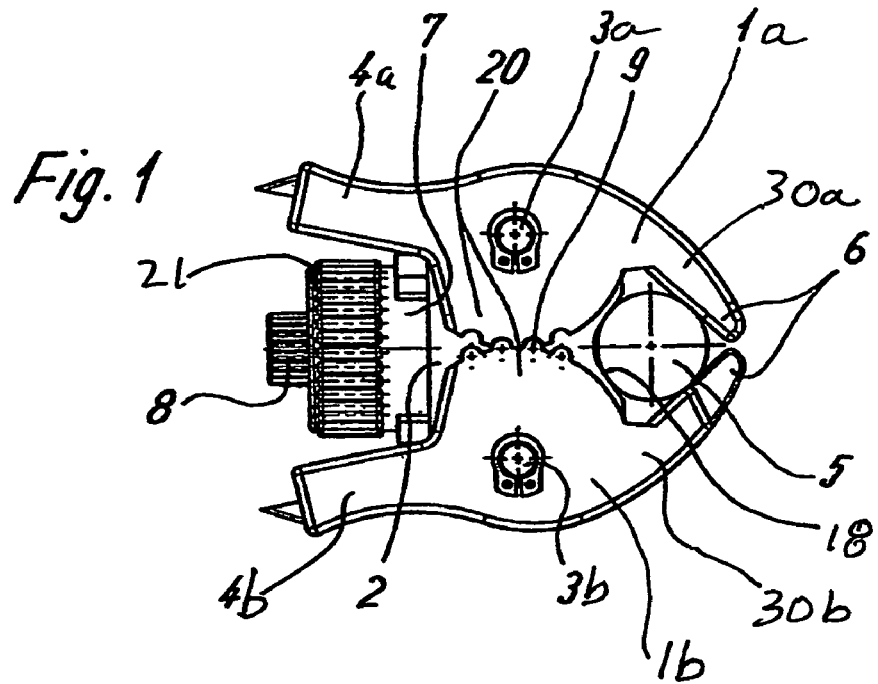
FIG. 1 is a left side elevation view of the insulation stripping tool of the present invention when in the clamping position.
Figure 4:
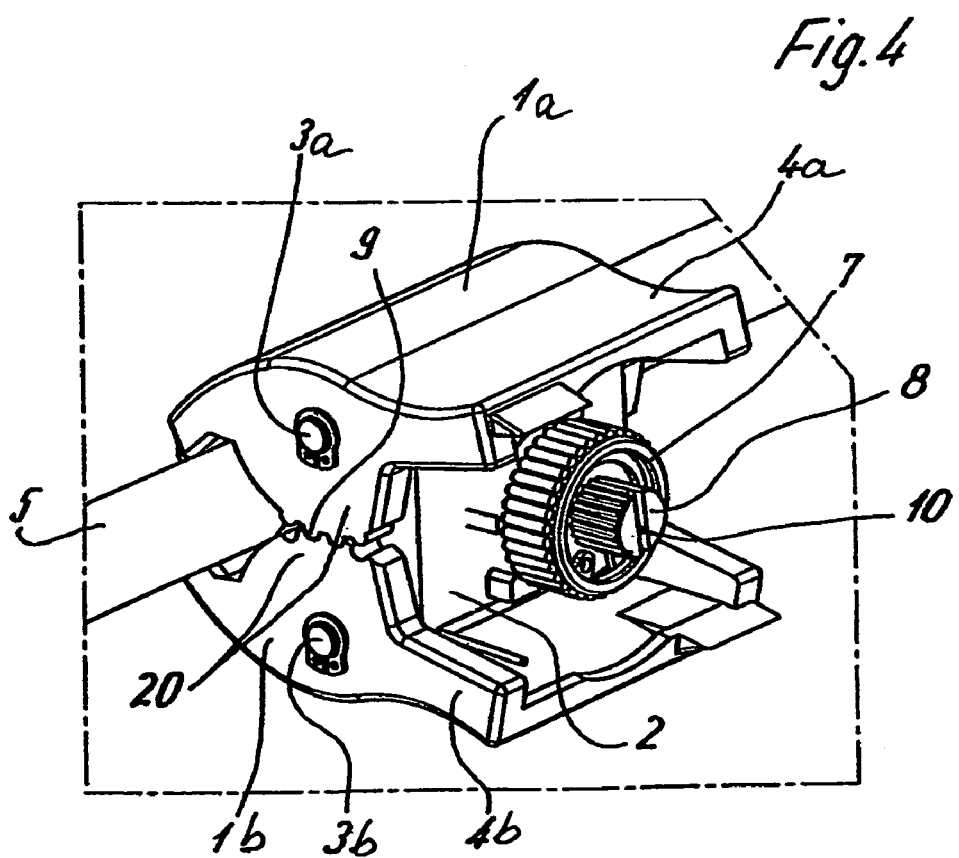
FIG. 4 is a rear left-hand perspective view of the insulation stripping tool of FIG. 1.

Referring first more particularly to FIGS. 1, 4, and 12, the insulation stripping tool of the present invention includes a tool body 2 to which are pivotally connected intermediate their ends a pair of clamping jaws 1a and 1b that pivot about spaced parallel pivot shafts 3a and 3b, respectively. At their one ends 30a and 30b, the clamping jaws are provided with clamping portions that are operable to clamp an insulated conductor 5 against recesses 18 (FIG. 12) contained in the tool body 2. More particularly, the tool body 2 has a U-shaped cross-sectional configuration to define a base portion 13 and a pair of parallel spaced leg portions 12. The free extremities of the leg portions 12 of the tool body 2 contain a pair of clamping recesses 18. As shown in FIG. 12, the clamping jaws 1a and 1b each have a U-shaped cross-sectional configuration, thereby defining opposed pairs of lateral flange portions 20a and 20b. These flange portions contain opposed openings that receive the pivot shafts 3a and 3b that are supported by corresponding openings contained in the leg portions 12 of the tool body. Lock washers 26 are provided for locking the flange portions of the clamping jaws to the ends of the pivot shafts 3. In accordance with an important feature of the invention, the two clamping jaws 1a and 1b are interconnected for simultaneous movement by means of cooperating pinion gear arrangement 9a and 9b on the adjacent surfaces of the flange portions 20 of the clamping jaws.

Figure 2:
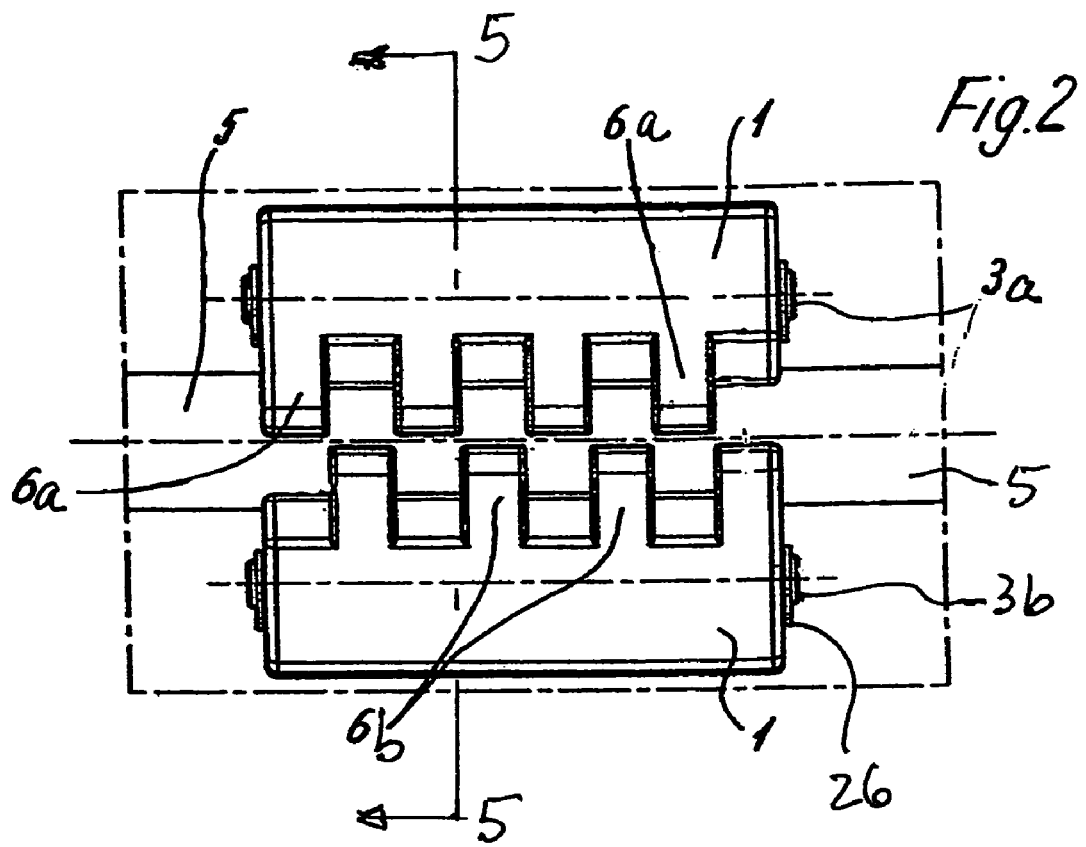
FIGS. 2 and 3 are front elevation and top plan views, respectively, of the insulation stripping tool of FIG. 1.
Figure 3:
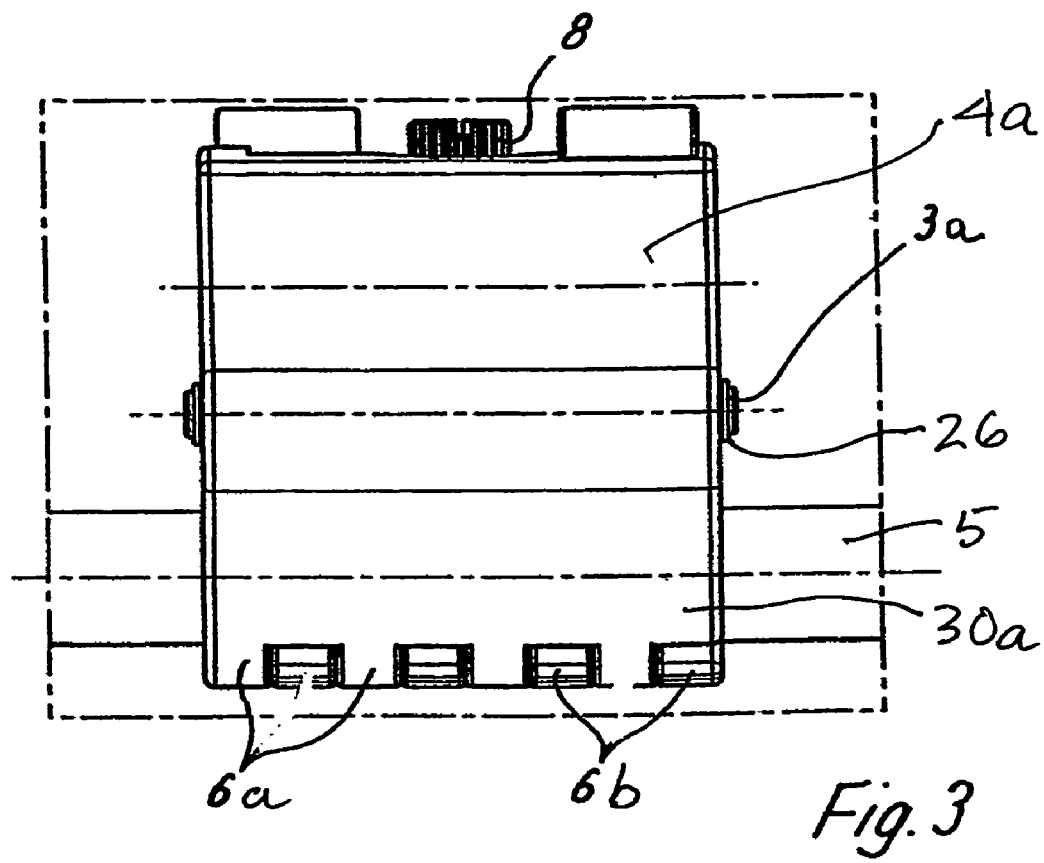

As shown in FIGS. 2 and 3, the clamping ends 30a and 30b of the clamping jaws are arranged for engagement with the outer circumferential surface of the insulated conductor 5. Staggered clamping teeth 6a and 6b are provided at the extremities of the clamping ends 30a and 30b, respectively. At their other ends, the clamping jaws 1a and 1b are provided with relatively short lever portions 4a and 4b that are operable to open the jaws from their illustrated closed clamping positions of FIGS. 1, 5, and 6 to their open positions of FIGS. 7 and 9. A torsion spring 19 (FIG. 12) mounted on the upper pivot shaft 3a serves to bias the clamping jaws 1a and 1b toward their closed clamping positions of FIG. 1.

Referring to FIGS. 5 and 12, in accordance with the present invention, a knife 11 is provided having a cylindrical knife body includes a linear cutting edge 11a at one end and an enlarge flat end portion 11b at its other end. The knife body is supported within an opening contained in a cylindrical knife support member 7 that is rotatably mounted in an opening contained in the base portion 13 of the tool body 12 between the leg portions 12, the cutting edge 11a at one end of the knife being arranged for engagement with the peripheral surface of the outer insulated layer of the clamped insulated conductor 5, as best shown in FIG. 5.

To prevent rotation of the knife about its longitudinal axis relative to the knife support member, the flat end portion 11b of the knife 11 extends through a linear slit 22 contained in a transversely arranged cross-pin 14. The ends of the cross-pin 14 extend within diametrically opposed longitudinal guide slots 16 formed in the wall of a first counterbore defined in the other end of the knife support member 7.

To control the depth of cut of the knife edge into the conductor insulation layer, a depth control member 8 is provided that is rotatably mounted within the first counterbore contained in the knife support member. At one end, the depth control member includes a sleeve portion containing an axial bore. The cross-pin 14 extends through a pair of diametrically arranged slots 15 (FIG. 12) contained in the left hand sleeve portion of the depth control member 8, which slots are angularly inclined relative to the longitudinal axis of the depth control member. The exposed free right hand end of the depth control member 8 is provided with a knob the end surface of which contains a diametrically extending slot 10 for receiving the operating tip portion of a screw driver or other sharp operating tool. The outer sleeve portion 21 of the rotatably mounted knife support member 7 is knurled so that the knife support member 7 may be rotated between a first position (FIGS. 6-8) in which the knife edge 11a of the knife 11 is vertical and normal to the axis of the base portion and the longitudinal axis of the insulated conductor, and a vertical second position (FIGS. 9 and 10) in which the knife edge 11a is horizontal and normal to the axis of the base portion 13 and the axis of the insulated conductor. The knife 11 is normally biased to the right in FIG. 5 by a helical spring 17 that is arranged in a second counterbore portion 24 defined in the right hand end of the knife support member 7. One end of the compression spring 17 reacts against the bottom wall of the counterbore 24, and the other end of the spring 17 engages an annular stop washer 23 that is concentrically mounted on the knife 11 and which abuts the cross-pin 14.

As shown in FIGS. 5-8, the through bore that is contained in the knife support member 7 is preferably eccentrically arranged relative to the longitudinal axis of the knife support member. Alternatively, the through bore could be centrally arranged in the knife support member. As will be described in greater detail below, when the knife support member 7 is in the first position shown in FIGS. 5-8, the linear knife edge 11a is vertically arranged to produce a circular circumferential cutting of the insulation layer on the insulated conductor. When the tool support member is rotated 90° to the second position of FIGS. 9 and 10, the knife edge 11a is now in a horizontal orientation to effect longitudinal severing of the insulation layer.

Referring now to FIG. 11, the slots 15 contained in diametrically opposed portions of the depth control member 8 are angularly arranged (i.e., inclined) relative to the longitudinal axis of the control member 8. The control member 8 has a free end that contains the diametrically extending slot 10 that is adapted to receive the operating tip of a screw driver or the like (not shown). Referring to FIGS. 5 and 12, a C-shaped spring clip 28 is provided for locking the depth control member 8 against axial displacement relative to the knife support member 7. Similarly, a C-shaped clip may be mounted in a groove contained in the outer periphery of the rotatable knife support member 7, thereby to prevent axial displacement of the knife support member relative to the tool body base portion 13.

As shown in FIG. 8, visible indicia 32 is provided on the end of the knife support member 7 to illustrate the position thereof relative to the tool body 2. Alternatively, a transparent window, opening or the like might be provided for illustrating the position of the knife support member.

Operation

In operation, assume that the insulation stripping tool is in the initial spring-biased clamping position of FIG. 1 and FIG. 4. Upon squeezing together of the lever portions 4a and 4b of the clamping jaws 1a and 1b, the jaw end 30a and 30b are pivoted toward the open position of FIGS. 7 and 8, thereby to permit a lateral portion of the insulated cable 5 to be inserted into the recesses 18. Upon release of the lever portions 4a and 4b, the clamping jaws are pivoted by the torsion spring 19 toward their clamping positions of FIGS. 1-5, thereby to clamp the insulted conductor against the walls of the recesses 18. Assuming that the knife edge 11a is in the vertical position of FIG. 8, the tool in the clamping condition is rotated about the insulated conductor 5, thereby to cause the knife edge 11a to sever a circular slit in the insulation layer of the insulated conductor 5. To effect a deeper cut, the operating tip of a screw driver is inserted within the diametric slot 10 to rotate the depth control member 8 in a given direction. Since the ends of the cross-pin 14 extend within the longitudinal grooves 16 contained in diametrically opposed portions of the first counterbore of the knife support member 7, the cross-pin 14 is displaced laterally by the incline slots 15 to axially displace the knife 11, thereby to vary the depth of the cut. Thus, by rotating the depth control member 8 in one direction, the depth of the cut is increased, and upon rotating the depth control member 8 in the opposite direction, the depth of the cut is reduced.

Following the formation of the circular cut around the entire circumference of the insulated conductor 5, the knife support member is manually rotated through 90° toward the position of FIGS. 9 and 10, so that the knife edge 11a is horizontal, whereby upon displacement of the insulation slitting tool longitudinally of the insulated conductor, a longitudinal cut in the insulation layer is produced by the knife edge 11a. The layer of insulation may then be stripped from the end of the insulated conductor. Of course, if desired, a pair of spaced circular circumferential cuts may be initially formed in the insulation layer, whereupon the knife support member is rotated through 90 degrees to produce a longitudinal cut between the two circular circumferential cuts, thereby to remove from an intermediate portion of the insulated conductor a given length of the insulated layer, whereby a portion of bare conductor is exposed between two insulated portions.

It is important to note that in accordance with the present invention, various types of insulated conductors of varying diameters may be stripped of insulation by use of the tool of the present invention. Thus, for a relatively thick insulated conductor such as a cable containing a plurality of insulated wires, the clamping ends of the jaws 1a and 1b are pivoted relatively far apart. For insulated conductors of relatively small diameters (such as a single insulated wire, for example), the clamping jaws are pivoted more closely together, whereupon the offset teeth 6a and 6b of FIGS. 2 and 3 are inter-engaged. It is noted that the torsion spring 19 is so mounted on the shaft 3a that the leg of the torsion spring engages lever 4a of the upper jaw 1a biases the jaws toward the closed clamping condition of FIG. 1. The cooperating teeth of the pinion gear means 9 serves to insure uniform swinging operation of the clamping jaws relative to the tool body 2.

It is possible, of course, in an alternate embodiment to provide two or more knife support members 7 with associated depth control members 8 in corresponding openings contained in the base portion 13 of a single tool body 2, thereby to effect simultaneous cutting of a plurality spaced circular cuts in the outer circumference of the insulated conductor.

While in accordance with the provisions of the Patent Statutes the preferred forms and embodiments of the invention have been illustrated and described, it will be apparent to those skilled in the art that changes may be made without deviating from the invention described above.

What is claimed is:

1. An insulation stripping tool for removing the outer layer of insulation from an insulated electrical conductor (5), comprising:
(a) a tool body (2);
(b) knife means mounted on said tool body, said knife including a knife member (11) having a knife edge (11a) extending outwardly from said tool body;
(c) clamping means for clamping to the tool body opposite said knife edge an intermediate transverse portion of the insulated electrical conductor, said clamping means including a pair of clamping jaws (1a, 1b) pivotally connected with said tool body, thereby to permit pivotal displacement of said clamping jaws about a pair of parallel pivot axes between closed clamping and open released positions, respectively, said clamping jaws having a generally U-shaped transverse cross-sectional configuration and including on said intermediate portions two pairs of opposed adjacent lateral flange portions (20); and
(d) connecting means connecting said clamping jaws for simultaneous pivotal movement relative to said tool body, said connecting means including interlocking pinion gear means (9) carried by said adjacent lateral flange portions, whereby upon displacement of said tool body relative to the insulated conductor, said knife edge severs the insulation layer of the conductor.

2. An insulation stripping tool as defined in claim 1, wherein said tool body has a generally U-shaped configuration defining a base portion (13) and a pair of parallel leg portions (12), said leg portions having free extremities containing a pair of opposed spaced conductor support means (18) defining a conductor support axis; wherein said knife member extends between, parallel with and spaced from said tool body leg portions, said knife edge being arranged in spaced relation between said conductor support means; and wherein said clamping means includes:
  (1) the pair of clamping jaws (1a, 1b) arranged externally of said tool body, each of said clamping jaws having first (30a, 30b) and second (4a, 4b) end portions and an intermediate portion;
  (2) a pair of parallel pivot shafts (3a, 3b) extending along the pair of parallel pivot axes said pivot shafts being supported between said tool body leg portions, said clamping jaw intermediate portions being pivotally mounted on said pivot shafts, respectively, thereby to permit pivotal displacement of said clamping jaws between open and closed positions relative to said conductor support means;
  (3) said clamping jaws first end portions being operable to clamp the insulated conductor intermediate portion against said conductor support means when said clamping jaws are in said clamping positions;
  (4) said clamping jaw second end portions defining operating levers for manually pivoting said clamping jaws toward said open positions; and
  (e) spring means (19) biasing said clamping jaws toward said closed positions, whereby when said clamping jaws are in their closed clamping positions, said tool body may be displaced relative to the insulated conductor to cause said knife edge to sever the insulation layer of the conductor.

3. An insulation stripping tool as defined in claim 2, and further wherein said clamping jaw first end portions include a plurality of staggered teeth (6a, 6b) that are in inter-engaged relation when said clamping jaws are in said clamping position.

4. An insulation stripping tool as defined in claim 2, wherein said spring means comprises a helical torsion spring (19) arranged concentrically about one of said clamping jaw pivot shafts.

5. An insulation stripping tool for removing the outer layer of insulation from an insulated electrical conductor (5), comprising:
  (a) a tool body (2) including conductor support means (18);
  (b) clamping means including a pair of pivotally connected clamping jaws (4a, 4b) for clamping an intermediate portion of the insulated conductor to said conductor support means, thereby to cause the longitudinal axis of the conductor intermediate portion to be fixed relative to said tool body;
  (c) a knife member (11) including a knife body having first and second end portions, said first end portion terminating in a transversely extending linear knife edge (11a); and
  (d) knife support means supporting said knife body for longitudinal displacement relative to said tool body base portion and with said knife edge adjacent said conductor support means, thereby to vary the depth of cut of said knife edge into the insulation layer of the insulated conductor, said knife support means comprising;
    (1) a cylindrical knife support member (7) rotatably connected with said tool body for angular displacement between first and second cutting positions in which said knife edge is normal to and parallel with the longitudinal axis of the insulated conductor, respectively, whereby said tool body may be displaced to produce alternate circular and longitudinal cuts in the conductor insulation layer, said knife body extending through a longitudinal through bore contained in said knife support member, said knife body second end portion terminating in an enlarged flattened end portion (11b); and
    (2) rotation-prevention means (14, 16) connecting said knife body against rotation relative to said knife support members, said rotation-prevention means comprising:
      (a) a cross-pin (14) extending transversely across a first counterbore contained in said knife support member, said cross-pin containing a non-circular slot (22) that non-rotatably receives said knife enlarged flattened end portion; and
      (b) longitudinal slot means (16) preventing rotational displacement of said cross-pin relative to the axis of said first counterbore.

6. An insulation stripping tool as defined in claim 5, wherein said knife support means further includes:
  (3) a cylindrical depth control member (8) concentrically mounted within said support body first counterbore,
    (a) said depth control member having a first end adjacent said knife body that comprises a tubular sleeve portion containing an axial bore that receives said cross-pin and said knife body second end,
    (b) said cross-pin extending diametrically across said axial bore via a pair of diametrically arranged guide slots (15) contained in said depth control member, the ends of said cross-pin extending into said longitudinal slot means,
    (c) said depth control member having a closed second end containing a diametrically extending actuating slot (10),
    (d) said guide slots being inclined relative to the longitudinal axis of said depth control member, such that upon rotation of said depth control member relative to said knife support member by means of an operating tool in engagement with said actuating slot, said cross-pin and said knife body are simultaneously laterally and axially displaced, respectively, relative to said knife support member.

7. An insulation stripping tool as defined in claim 6, wherein said knife support member contains a second counterbore (24); and further including a helical compression spring (12) arranged within said second counterbore concentrically about said knife body, said compression spring reacting between the bottom wall of the second counterbore and said cross-pin to bias said transverse pin in a direction that reduces the depth of cut in the insulation layer by the knife edge.

8. An insulation stripping tool as defined in claim 5, and further including indicia means (32) on said knife support member for indicating the rotational position thereof relative to said tool body.

9. An insulation stripping tool as defined in claim 5, wherein said longitudinal through bore contained in said knife support member is eccentric to the longitudinal axis of said knife support member.

* * * * *